Figure 1:
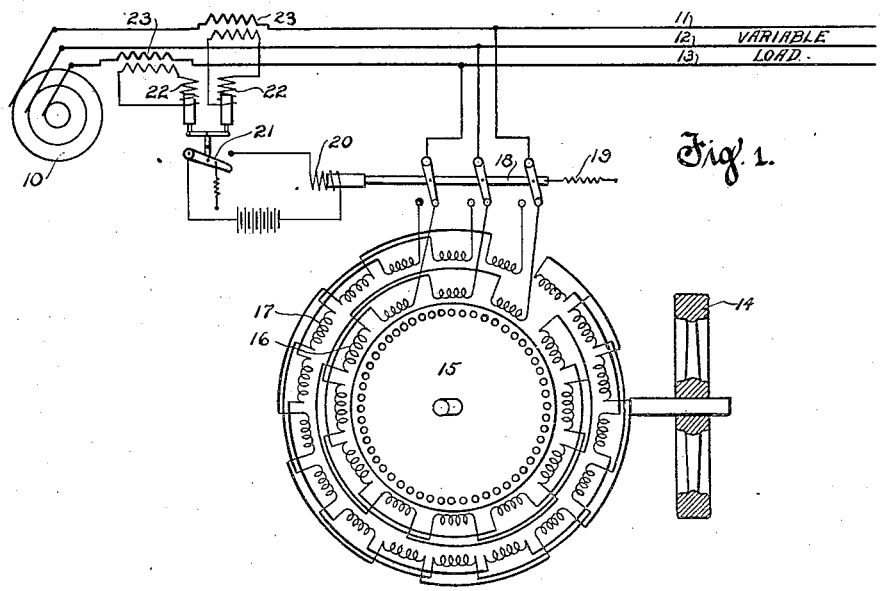

L. C. MARBURG.
SYSTEM OF DISTRIBUTION.
APPLICATION FILED JAN. 7, 1910.

1,147,417.

Patented July 20, 1915.

Witnesses
John L. Johnson
Chas. L. Byron

Inventor
Louis C. Marburg
By Chas. E. Lord
Attorney

UNITED STATES PATENT OFFICE.

LOUIS C. MARBURG, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF DISTRIBUTION.

1,147,417.      Specification of Letters Patent.      Patented July 20, 1915.

Application filed January 7, 1910. Serial No. 536,878.

*To all whom it may concern:*

Be it known that I, LOUIS C. MARBURG, a citizen of the United States, residing at Milwaukee, in the county of Milwaukee and State of Wisconsin, have invented certain new and useful Improvements in Systems of Distribution, of which the following is a full, clear, and exact specification.

My invention relates to systems of electrical distribution.

In many electrical systems the load fluctuates very rapidly between wide limits, the upper limit often greatly exceeding the capacity of the generator supplying the system. In systems of this sort it has been proposed to connect across the line a dynamo-electric power device whose rotating member has large inertia, which power device acts as motor to store up kinetic energy when the load on the line is light and as generator driven by such stored energy when the load on the line is heavy.

It is the object of my present invention to obtain in a system of this sort, especially where the system is an alternating current one, an arrangement by which the storing and giving up of the kinetic energy may be more readily and accurately controlled. In attaining this object a rather novel arrangement is used by which the relation between the synchronous speed of the dynamo-electric power device and the speed at which the power device is actually rotating under the influence of the rotating mass in which kinetic energy is stored, is varied, preferably under the control of the load on the circuit. In the illustrated arrangements, which, though shown in connection with alternating current systems, are not limited to such systems, there is a dynamo-electric power device having a rotating member of large inertia, and this dynamo-electric power device has two windings arranged when respectively rendered effective to give the power device two different maximum motor speeds. The speed at which the power device normally runs is between these two speeds, and one or the other of the two windings is rendered effective according as the load on the circuit is light or heavy. When the load is light, the winding which gives the higher maximum motor speed is effective and the power device acts as motor to store up kinetic energy in its massive rotating member. When the load is heavy, the winding which gives the lower maximum motor speed is effective and the stored energy is given up to drive the power device as generator to cause it to supply energy to the circuit. The rate at which the dynamo-electric power device takes energy from the line or gives energy to the line may be adjustable. Preferably the whole operation, including the cutting in and out of the two windings and the adjustment of the rate of energy consumption or production by the dynamo-electric power device, is automatically controlled. The dynamo-electric power device is illustrated as of the induction motor type, comprising either two separate machines or a single machine with two primary windings. Either the wound rotor or the squirrel cage type may be used, in the former case the adjustment of the energy production or consumption being preferably regulated by an adjustable resistance in the secondary winding or windings.

The various novel features of my invention will be apparent from the description and drawings, and will be particularly pointed out in the claims.

Figure 2:
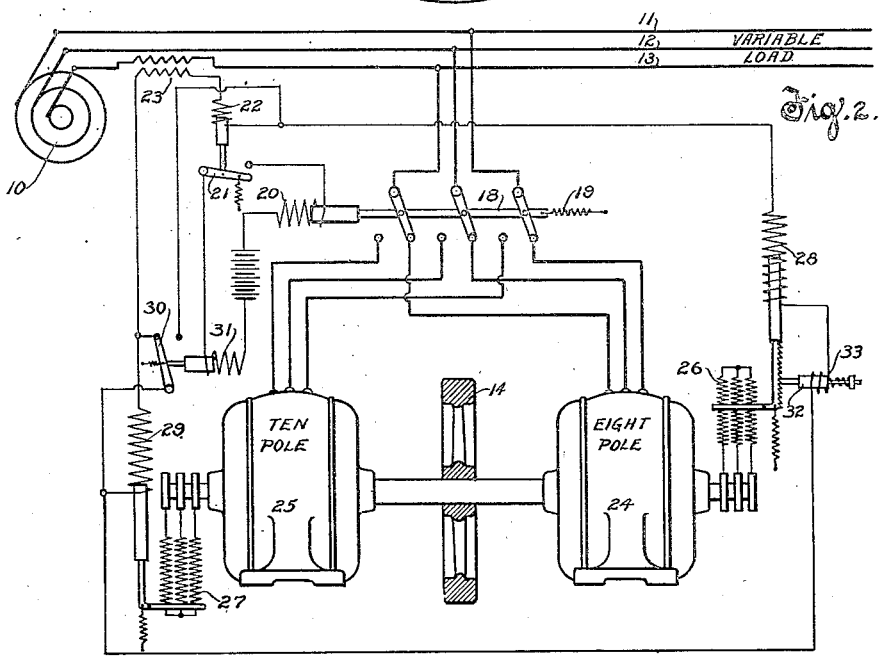

Figure 1 shows diagrammatically one embodiment of my invention in which a single squirrel cage type induction motor with two primary windings having different numbers of poles is used; and Fig. 2 shows diagrammatically my invention as embodied with two separate wound rotor type induction motors having variable resistances in their secondary circuits.

The generator 10 supplies the distribution circuit 11—12—13, on which there is a load which fluctuates quite rapidly within wide limits. This load may be of any character, but the invention is especially applicable to those cases where the variable load is a power load, consisting, for instance, of one or more rolling mill motors. The generator 10 is here shown as a three-phase generator, but my invention in its broader aspect is not limited to alternating current systems. Across the circuit 11—12—13 is connected a dynamo-electric power device the rotating member of which has large inertia, as by being mechanically connected to a fly-wheel 14. This dynamo-electric power device is arranged to act as motor to store up energy in the fly-wheel when the load on the circuit 11—12—13 is light, and as generator driven by the energy stored in the fly-wheel to supply current to the circuit 11—12—13 when the load on such circuit is heavy. The arrangement for controlling the consumption and production of energy by the dynamo-electric power device and fly-wheel is the essence of my present invention.

In the arrangement shown in Fig. 1, the dynamo-electric power device consists of an induction motor 15, here illustrated as of the squirrel cage type. The synchronous speed of this motor may be varied as by changing the number of poles of the motor in any desired manner. As shown this is obtained by providing two three-phase windings 16 and 17. For convenience of illustration, these two windings are shown one outside the other. These two windings have different numbers of poles, the winding 16 being illustrated as a four-pole winding and the winding 17 as a six-pole winding. The actual number of poles in the two windings may be anything desired, it being only essential that the number of poles in the two windings be different. By means of a switch 18, either of the windings 16 and 17 may be connected to the circuit 11—12—13. The switch 18 is biased, as by a spring 19, to the position in which it connects the winding 16 to the circuit, but may be moved to its other position by means of a solenoid 20 controlled in response to the current in the supply circuit. The solenoid 20 may be connected in any desired manner to produce this result, but is preferably controlled by a switch 21 arranged to be closed by solenoids 22 supplied by current transformers 23 associated with the main circuit. Two current transformers are shown, but if desired only one may be used, as shown in Fig. 2. The motor 15 may be started in any desired manner. When the load on the circuit 11—12—13 is below a predetermined value, the switch 18 is in the position shown and the four-pole winding 16 is energized to drive the motor 15 to store up energy in the fly-wheel 14. When the load on the circuit increases, and the current supplied by the generator 10 exceeds the value for which the switch 21 is set, said switch is closed and the solenoid 20 is energized to move the switch 18 to the left to cause the energization of the six-pole winding 17 and the deenergization of the four-pole winding 16. In consequence of this shift of windings, the synchronous speed of the motor 15 is reduced to two-thirds its former value, and below the actual speed at which the rotor is turning. Consequently, the motor 15, its actual speed being above its synchronous speed, acts as a generator driven by the energy stored in the fly-wheel 14 to supply current to the circuit 11—12—13 at the same frequency at which the generator 10 supplies said circuit. As soon as the load on the circuit 11—12—13 drops and the current supplied by the generator 10 becomes less than that for which the switch 21 is set, said switch is allowed to open and the solenoid 20 is deënergized to allow the spring 19 to throw the switch 18 back to its right hand position and thus cause the deënergization of the six-pole winding 17 and the energization of the four-pole winding 16. The synchronous speed of the motor 15 is now raised to its original value, and the motor runs once more as a motor to store kinetic energy in the fly-wheel 14. This cycle is repeated as often as the current supplied by the generator 10 fluctuates between values above or below the predetermined value for which the switch 21 is set.

In the arrangement shown in Fig. 2, the dynamo-electric power device consists of two separate induction motors 24 and 25 having different numbers of poles, say eight and ten respectively. The primary windings of these motors are excited when the switch 18 is in its right-hand and left-hand positions respectively. The switch 18 is controlled in precisely the same way as in the arrangement of Fig. 1, though in the arrangement shown in Fig. 2 there is but one current transformer 23. The two motors 24 and 25 are mechanically connected together and to the fly-wheel 14, preferably by being mounted on the same shaft with the fly-wheel. The motors 24 and 25, as well as the motor 15 in the arrangement shown in Fig. 1, may be either of the squirrel cage or the wound rotor type, but the motors 24 and 25 are preferably of the latter type with variable resistances 26 and 27 in their respective secondary circuits. These resistances are preferably varied by two solenoids 28 and 29 respectively, the solenoid 28 tending to cut the resistance 26 into the secondary circuit of the motor 24 and the solenoid 29 tending to cut the resistance 27 out of the secondary circuit of the motor 25. The solenoids 28 and 29, which are preferably so designed that their cores have comparatively large movements upon small changes in the supplied current, when energized, carry currents proportional to the current supplied by the generator 10, being preferably connected in series with the solenoid 22 and supplied from the secondary of the current transformer 23. However, the solenoids 28 and 29 may be energized only when the primary windings of their respective associated motors 24 and 25 are energized, a switch 30 being provided which short-circuits the solenoids 29 and 28 when the switch 18 is in its right-hand and left-hand positions respectively. This result may be obtained by operating the switch 30 by a solenoid 31 connected in series with the solenoid 20 and with it controlled by the switch 21 and solenoid 22. When the load on the circuit 11—12—13 is small, and the current supplied by the generator 10 is below the predetermined value for which the switch 21 is set, the switch is in the position shown and the eight-pole motor 24 is energized and operates as motor to store up energy in the fly-wheel 14. The resistance in the secondary circuit of the motor 24 is varied by the solenoid 28 in the same sense as the current supplied by the generator 10, so that the current taken from the circuit 11—12—13 by the motor 24 will vary inversely as the other load on such circuit: that is, by means of the solenoid 28 and resistance 26 the slip of the motor 24 is caused to increase as the load on the circuit 11—12—13 increases. The ten-pole motor 25 and the solenoid 29 are deënergized at this time, and all the resistance 27 is in the secondary circuit of the motor 25. As the load on the circuit 11—12—13 rises, the solenoid 28 cuts more and more of the resistance 26 into the secondary circuit of the motor 24, thus increasing the slip of said motor. When the current supplied by the generator 10 exceeds the predetermined value for which the switch 21 is set, said switch is closed and the solenoids 20 and 31 energized. The solenoid 20 throws the switch 18 to the left to cause the deënergization of the eight-pole motor 24 and the energization of the ten-pole motor 25, thus reducing the synchronous speed of the dynamo-electric power device to four-fifths its former value, and below the actual speed at which such power device is rotating. The solenoid 31 throws the switch 30 to the right to cause the deënergization of the solenoid 28 and the energization of the solenoid 29. The core of the solenoid 28 and the resistance-varying bar of the resistance 26 may, if desired, be prevented from dropping at this time, as by means of a latch 32, which, by means of a solenoid 33 connected in series with the solenoid 28, is held in an inoperative position whenever the solenoid 28 is energized and then only. The fly-wheel 14 now drives the ten-pole motor 25 above its synchronous speed and causes it to act as generator to supply current to the circuit 11—12—13. The rate at which the motor 25 supplies current to the circuit is controlled by the solenoid 29, which varies the resistance 27 to cause said motor to supply a current varying directly as the increase in load on the circuit 11—12—13 above the normal value. When the load on the circuit now decreases, and the current supplied by the generator 10 falls below the normal value, the solenoid 22 allows the switch 21 to drop, thus causing the deënergization of the solenoids 20 and 31, which in turn allow the switches 18 and 30 to move to the right and left respectively to cause the energization of the eight-pole motor 24 and the solenoid 28 and the deënergization of the ten-pole motor 25 and the solenoid 29. The motor 24 now operates to take current from the circuit 11—12—13 and to store energy in the fly-wheel 14. This cycle is repeated, with more or less completeness, as demanded by the fluctuations in the load on the circuit 11—12—13.

Two specific embodiments of my invention have been described in the foregoing, but the invention is not limited to such embodiments. Other means for varying the synchronous speed of the dynamo-electric power device may be used besides those shown, and it is not necessary in all cases that the dynamo-electric power device be of the induction motor type. Indeed, in many of its aspects the invention is applicable to other than alternating current systems. When two exciting windings are used in the dynamo-electric power device, it is only necessary that they produce different maximum motor speeds; that is, that the speeds at which the counter electromotive force becomes equal to the impressed electromotive force shall be different. The large inertia needed may of course be inherent in the rotor of the dynamo-electric power device, or may be obtained by having a separate fly-wheel mechanically connected to such rotor, as by being mounted on the same shaft therewith; both forms are included when such expressions as "a dynamo-electric power device having a rotating member of large inertia" are used.

Many other modifications in the precise arrangements shown and described may be made without departing from the spirit and scope of my invention, and all such I aim to cover in the following claims.

What I claim as new is:

1. In combination, an alternating current generator, an alternating current circuit supplied thereby and carrying a variable load, a dynamo-electric power device of the induction type including a rotating part of great inertia, two primary windings adapted to determine different pole numbers and two secondary windings, a variable resistance in the circuit of each secondary winding, regulating means for each of said resistances, and means controlled by the current supplied by said generator for connecting the primary windings of higher and lower numbers of poles across said circuit when the current supplied by said generator is respectively above and below a predetermined value and for rendering each of said resistance regulating means operative when its corresponding primary winding is connected in circuit.

2. In combination, an alternating current generator, an alternating current circuit supplied thereby and carrying a variable load, a dynamo-electric power device of the induction type including a rotating member of great inertia, said dynamo-electric power device being provided with a primary winding element adapted to determine different pole numbers and a secondary winding element provided with a variable resistance, and means responsive to the load on said generator for rendering said primary winding element effective to produce one or another number of poles and for varying the effective secondary resistance of said power device.

3. In combination, a generator, a circuit supplied thereby and carrying a variable load, a fly-wheel, two motors mechanically connected to said fly-wheel and capable, when operated at their respective maximum motor speeds, of driving it at different speeds, connections between each motor and said circuit, a variable resistance in the circuit of each motor, and means for rendering one set of connections and the resistance in the circuit of the corresponding motor effective when the load on the circuit is heavy and the other set of connections and the resistance in the circuit of the corresponding motor effective when the load on the circuit is light.

4. In combination, a generator, a variable load supplied thereby, a fly-wheel, two motors mechanically connected to said fly-wheel and capable of driving it at different speeds when connected to said generator circuit, a variable resistance for the circuit of each motor, regulating means for said resistance, and means responsive to the load on said generator for connecting either of said motors to the generator circuit and for simultaneously rendering effective the means for regulating the resistance in the circuit of the motor so connected.

5. In combination, an alternating current circuit, an alternating current dynamo-electric power device including a plurality of flux generating windings capable of determining different pole numbers, and a rotating member of great inertia, and means responsive to the load on said circuit for connecting either of said windings across said circuit and for regulating the energy absorbed or given out by said power device when either of said windings is so connected.

Milwaukee, Wis., Dec. 22, 1909.

In testimony whereof I affix my signature, in the presence of two witnesses.

LOUIS C. MARBURG.

Witnesses:
ALEX. J. NICHT, Jr.,
CHAS. L. BYRON.